United States Patent [19]

Tonar et al.

[11] Patent Number: 5,682,267
[45] Date of Patent: Oct. 28, 1997

[54] IMAGE/INFORMATION DISPLAYS ON ELECTROCHROMIC MIRRORS FOR MOTOR VEHICLES

[75] Inventors: William L. Tonar; Lyman G. Wakeman, both of Holland, Mich.

[73] Assignee: Gentex Corporation, Zeeland, Mich.

[21] Appl. No.: 576,689

[22] Filed: Dec. 21, 1995

Related U.S. Application Data

[60] Provisional application No. 60/002,945, Aug. 30, 1995.
[51] Int. Cl.$^6$ .............................. G02B 27/00; G02B 5/08; G02F 1/153
[52] U.S. Cl. .................. 359/603; 359/601; 359/602; 359/604; 359/273; 359/275; 359/267; 359/269
[58] Field of Search ........................ 359/601, 602, 359/603, 604, 273, 275, 267, 269

[56] References Cited

U.S. PATENT DOCUMENTS

| | | | |
|---|---|---|---|
| 5,189,537 | 2/1993 | O'Farrell | 359/71 |
| 5,446,577 | 8/1995 | Bennett et al. | 359/273 |

*Primary Examiner*—Paul M. Dzierzynski
*Assistant Examiner*—Mohammad Y. Sikder
*Attorney, Agent, or Firm*—Malcolm R. McKinnon

[57] ABSTRACT

An improved electrochromic rearview mirror for motor vehicles, the mirror incorporating an improved display which economically and efficiently displays information or images or symbols on the mirror in a reliable and aesthetically pleasing manner while providing excellent speed of reflective change, good high end reflectance, good uniformity of reflectance change across the surface area of the mirror, continually variable reflectance and good low end reflectance while displaying desired information or images or symbols throughout the range of reflectance of the mirror.

8 Claims, 2 Drawing Sheets

IMAGE/INFORMATION DISPLAYS ON ELECTROCHROMIC MIRRORS FOR MOTOR VEHICLES

This application claims the benefit of U.S. Provisional application Ser. No. 60/002,945, filed Aug. 30, 1995.

BRIEF SUMMARY OF THE INVENTION

This invention relates to image/information displays on electro-optic devices and, more particularly, to improved image/information displays on electrochromic mirrors for motor vehicles.

Heretofore, various automatic rearview mirrors for motor vehicles have been devised which automatically change from the full reflectance mode (day) to the partial reflectance mode (night) for glare protection purposes from light emanating from the headlights of vehicles approaching from the rear. The electrochromic mirrors disclosed in U.S. Pat. No. 4,902,108, issued Feb. 20, 1990, for Single-Compartment, Self-Erasing, Solution-Phase Electrochromic Devices, Solutions for Use Therein, and Uses Thereof; U.S. Pat. No. 4,917,477, issued Apr. 17, 1990, for Automatic Rearview Mirror System for Automotive Vehicles; U.S. Pat. No. 5,128,799, issued Jul. 7, 1992, for Variable Reflectance Motor Vehicle Mirror; U.S. Pat. No. 5,202,787, issued Apr. 13, 1993, for Electro-Optic Device; U.S. Pat. No. 5,280,380, issued Jan. 18, 1994, for UV-Stabilized Compositions and Methods; and U.S. Pat. No. 5,282,077, issued Jan. 25, 1994, for Variable Reflectance Mirror, each of which patents is assigned to the assignee of the present invention and the disclosures of each of which are hereby incorporated herein by reference, are typical of modem day automatic rearview mirrors for motor vehicles. Such electrochromic mirrors may be utilized in a fully integrated inside/outside rearview mirror system or as an inside or an outside rearview mirror system. In general, in automatic rearview mirrors of the types disclosed in U.S. Pat. Nos. 4,902,108; 4,917,477; 5,128,799; 5,202,787, 5,280,380 and 5,282,077, both the inside and the outside rearview mirrors are comprised of a relatively thin electro-optic medium sandwiched and sealed between two glass elements. In most cases, when the electro-optic medium is electrically energized, it darkens and begins to absorb light, and the higher the voltage, the darker the mirror becomes. When the electrical voltage is decreased to zero, the mirror returns to its clear state. Also, in general, the electro-optic medium sandwiched and sealed between the two glass elements is preferably comprised of solutions of electrochromic compounds which function as the media of variable transmittance in the mirrors, although it should be understood that other electro-optic media may be utilized, including an approach wherein a tungsten oxide electrochromic layer is coated on one electrode with a solution containing at least another compound to provide counter electrode reaction. When operated automatically, the rearview mirrors of the indicated character generally incorporate light-sensing electronic circuitry which is effective to change the mirrors to the dimmed reflectance modes when glare is detected, the sandwiched electro-optic medium being activated and the mirror being dimmed in proportion to the amount of glare that is detected. As glare subsides, the mirror automatically returns to its normal high reflectance state without any action being required on the part of the driver of the vehicle. The electro-optic medium is disposed in a sealed chamber defined by a transparent front glass element, a peripheral edge seal, and a rear mirror element having a reflective layer, the electro-optic medium filling the chamber. Conductive layers are provided on the inside of the front and rear glass elements, the conductive layer on the front glass element being transparent while the conductive layer on the rear glass element may be transparent or the conductive layer on the rear glass element may be semi-transparent or opaque and also have reflective characteristics and function as the reflective layer for the mirror assembly. The conductive layers on both the front glass element and the rear glass element are connected to electronic circuitry which is effective to electrically energize the electro-optic medium to switch the mirror to nighttime, decreased reflectance mode when glare is detected and thereafter allow the mirror to return to the daytime, high reflectance mode when the glare subsides as described in detail in the aforementioned U.S. Patents. For clarity of description of such a structure, the front surface of the front glass element is sometimes referred to hereinafter as the first surface, and the inside surface of the front glass element is sometimes referred to as the second surface. The inside surface of the rear glass element is sometimes referred to as the third surface, and the back surface of the rear glass element is sometimes referred to as the fourth surface.

In the past, information or images or symbols, such as "HEATED" or "OBJECTS IN MIRROR ARE CLOSER THAN THEY APPEAR" or other indicative symbols have been displayed on rearview mirrors for motor vehicles, particularly on outside rearview mirrors. For example, with first surface chromium type reflective mirrors, such information has been sandblasted, etched or otherwise formed on the front reflective surface. With fourth surface reflector electrochromic mirrors, such information has been sandblasted, etched or otherwise formed on the fourth surface. However, these methods are not suitable for use with a third surface reflector because of double image parallax in the case of first surface imaging, or the image not being visible because it is behind the reflective surface in the case of the fourth surface imaging. Moreover, neither of these methods are aesthetically acceptable.

In accordance with the present invention, improved means is provided for displaying information or images or symbols, such as "HEATED" or "OBJECTS IN MIRROR ARE CLOSER THAN THEY APPEAR" or the like on electrochromic mirrors for automotive vehicles, particularly on outside rearview mirrors although it will be understood that, if desired, information or images may be displayed on inside electrochromic mirrors.

In accordance with one aspect of the present invention, a reflective layer is provided on the inside (third surface) of the back glass of an electrochromic rearview mirror, which layer may, for example, also form an integral electrode in contact with the electrochromic media, i.e. a combination reflector/electrode. The other electrode on the inside (second) surface of the front glass is a transparent electrode which also contacts the electrochromic media inside the mirror element. The reflector/electrode may be comprised, for example, of a base reflective coating which bonds to the glass surface, and a transparent conductive over coating which directly contacts the electrochromic media. It will be understood that the reflector/electrode may have one or more base coatings and one or more over coatings or a single layer may perform both the reflective and the conductive functions.

The transparent coating on the second surface of the mirror is preferably fluorine doped tin oxide, tin doped indium oxide (ITO) or a series of metal oxide coatings with base coatings to suppress color and reflection followed by an electrically conductive, transparent coating which contacts the electrochromic media directly. The materials are preferably chosen for good bonding, resistance to corrosion by the materials of the electrochromic media, resistance to corrosion by the atmosphere, minimal reflectance, high light transmission, neutral coloration and high electrical conductance. Also, to a considerable extent, it is possible to make the reflective electrode very high in electrical conductance to compensate in a synergistic fashion with a transparent electrode that is lower in electrical conductance so the net result is an electrochromic mirror which darkens and clears acceptably fast and uniformly with excellent optical properties.

This synergistic structure is applicable for both inside and outside rearview mirrors for motor vehicles. When the multilayer combination reflector/electrode is used in any mirror, it has the inherent advantage of reducing double images, distortion, and multiple images from raindrops, dust, etc., while providing excellent speed of reflectance change, good high end reflectance, good uniformity of reflectance change across the surface area of the mirror, neutral color, continually variable reflectance and a low end reflectance low enough to relieve strong glare. The reduction in double images and distortion is particularly useful in the case of dimmable convex mirrors which use glass that is bent but may have slight variations in radius of curvature or slight ripple or warp that result in slight imperfections in matching two pieces of bent glass required to make a convex, solution based electrochromic mirror.

An object of the present invention is to overcome disadvantages in prior rearview mirrors of the indicated character and to provide an improved electrochromic rearview mirror for motor vehicles, which mirror incorporates improved means for displaying information or images or symbols, such as "HEATED" or "OBJECTS IN MIRROR ARE CLOSER THAN THEY APPEAR" or the like, on the mirror.

Another object of the present invention is to provide an improved electrochromic rearview mirror which colors and clears uniformly and which displays information or images or symbols on the mirror in an aesthetically pleasing manner.

Another object of the present invention is to provide an improved electrochromic rearview mirror for motor vehicles, which mirror incorporates improved means for economically and efficiently displaying information or images or symbols on the mirror in a reliable manner.

Still another object of the present invention is to provide an improved electrochromic rearview mirror for motor vehicles wherein excellent speed of reflective change, good high end reflectance, good uniformity of reflectance change across the surface area of the mirror, neutral color, continually variable reflectance and good low end reflectance are obtained while displaying desired information or images or symbols throughout the range of reflectance of the mirror.

The above as well as other objects or advantages of the present invention will become apparent from the following description and the accompanying drawings.

DETAILED DESCRIPTION

In general, in automatic rearview mirrors embodying the present invention, the rearview mirror is comprised of a thin layer of a chemical solution sandwiched between two glass elements. As the chemical layer is electrically energized, it darkens and begins to absorb light. The higher the voltage, the darker the mirror becomes. When the electrical voltage is decreased to zero, the mirror returns to its clear state. Automatic rearview mirrors embodying the present invention may incorporate light sensing electronic circuitry of the type illustrated and described in U.S. Pat. No. 4,917,477, issued Apr. 17, 1990, for Automatic Rearview System for Automotive Vehicles, and assigned to the assignee of the present invention. Also, the electrochromic components of mirrors embodying the present invention may be of the type disclosed in U.S. Pat. No. 4,902,108, issued Feb. 20, 1990, for Single-Compartment, Self-Erasing, Solution-Phase Electrochromic Devices, Solutions for Use Therein, and Uses Thereof, and assigned to the assignee of the present invention. The entire disclosures of U.S. Pat. Nos. 4,917,477 and 4,902,108 are incorporated herein by reference.

Figure 2:
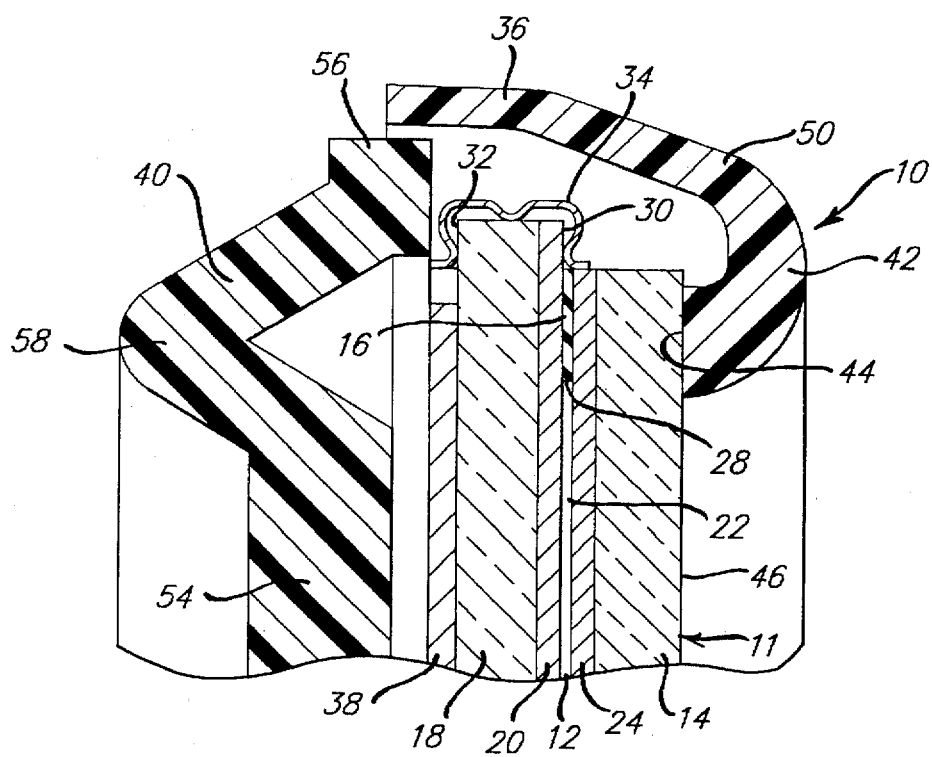
FIG. 2 is an enlarged cross sectional view, with portions broken away for clarity of illustration, of the automatic rearview mirror illustrated in FIG. 1.
Figure 3:
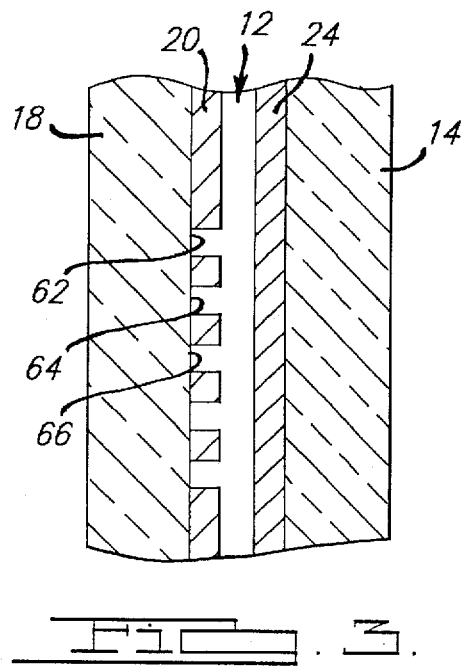
FIG. 3 is an simplified cross sectional view of the image/information display means incorporated in the mirror illustrated in FIGS. 1 and 2.

An electrochromic minor, generally designated 10, embodying the present invention is depicted in simplified cross-section in FIG. 2. Since some of the layers of the mirror are very thin, the scale has been distorted for pictorial clarity. As shown in FIG. 2, the electrochromic assembly 11 includes a sealed chamber 12 defined by a clear front glass 14, an edge seal 16, and a clear rear glass 18 having a conductive/reflective layer 20. A chemical solution 22 having the desired electrochromic properties fills the chamber 12, and a transparent conductive layer 24 is provided on the second surface of the front glass 14. The layers 20 and 24 may be connected, for example, to electrical control circuits as described in the aforementioned patents. Light rays enter through the front glass 14, the transparent conductive layer 24, and the electrochromic layer 22, before being reflected from the conductive reflective layer 20 provided on the third surface of the mirror glass layer 18. Light in the reflected rays exit by the same general path traversed in the reverse direction. Both the entering rays and the reflected rays are attenuated in proportion to the degree to which the electrochromic solution 22 is light absorbing. When the electrochromic solution 22 is highly light absorbing, the intensity of the exiting rays is diminished, the dim image remaining being from light rays which are reflected off of the front and back surfaces of the front glass 14. Thus, the basic structural elements of the electrochromic assembly include two electrode-bearing sides or walls, a seal 16, which spaces apart and holds the walls in substantially parallel relationship in an assembled device, and which surrounds a volume which in an assembled device is comprised of electrode layers on the electrode-bearing walls as well as the circumferential inside walls 28 of the spacing and sealing layer 16. The volume of the chamber 12 may be filled with any of the solutions disclosed in U.S. Pat. No. 4,902,108 which have reversibly variable transmittance in the operation of the device, the solution in the chamber 12 being in contact with both electrode layers 20 and 24 during operation of the mirror.

With reference to FIG. 2, a preferred arrangement for connecting the layers 20 and 24 to a power source is illustrated. In this arrangement, the two electrode-bearing front and rear glass plates 14 and 18 are displaced in opposite directions, laterally from, but parallel to the chamber 12 in order to provide exposed areas 30 and 32. In the embodiments of the invention illustrated in the drawings, electrically conductive spring clips 34 are provided which are placed on the coated glass sheets to make electrical contact with the exposed areas of the conductors 20 and 24, respectively. Suitable electrical conductors (not shown) may be soldered or otherwise connected to the spring clips so that desired voltage may be applied to the device from a suitable power source, it being understood that other means for making electrical contact with the conductors 20 and 24 may be utilized if so desired.

As illustrated in the drawings, automatic rearview mirrors 10 embodying the present invention include a bezel 36, the electrochromic assembly 11 previously described, a heater 38, and a mirror back 40 which is adapted to snap into an outside mirror housing (not shown) that may be of any desired configuration, the outside mirror housing being supported on the outside of the automotive vehicle in any desired or conventional manner whereby the field of view of the mirror may be adjusted by the driver of the vehicle in a conventional manner, as for example through manual adjustment or by mechanical or electrical means of the type conventionally provided on modem day automobiles.

Figure 1:
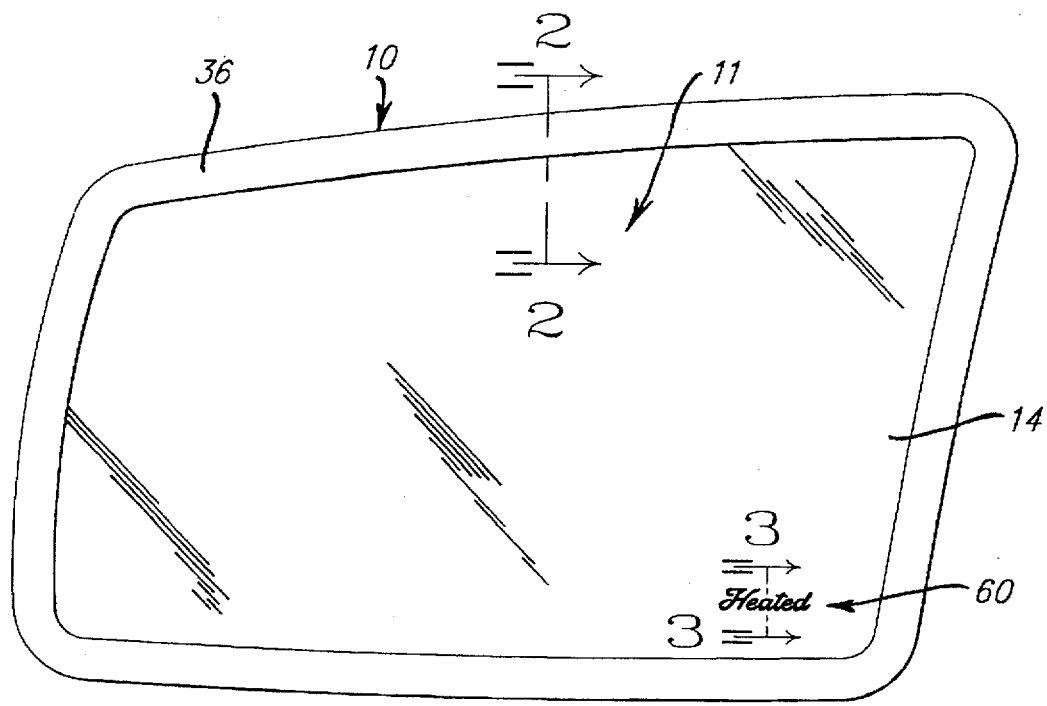
FIG. 1 is a front elevational view of an automatic rearview mirror embodying the present invention, the mirror being particularly adapted for use as an outside rearview mirror on automotive vehicles.

As shown in FIGS. 1 and 2, the bezel 36 surrounds the electrochromic assembly 11 in a circumferential manner, the bezel 36 overlying the electrochromic assembly 11 so as to conceal the edge portions thereof including the electrically conductive spring clips 34. The bezel includes an exposed, curvilinear main body portion 42 which extends around the entire circumference of the electrochromic mirror assembly 11. The main body portion 42 includes a flat surface 44 which may be sealed to the exposed surface 46 of the glass element 14 through the agency of a suitable glass sealant. The bezel 36 also includes a skirt portion 50 which extends around the entire periphery of the side edges of the electrochromic assembly 11 and also overlies the outside wall of the mirror back 40. The bezel itself is preferably injection molded from a plastic suitable for exterior automotive use.

If desired, outside mirror assemblies embodying the present invention may also include the electrical heater 38 which functions to defrost the mirror, the heater 38 preferably being a full surface heater, or the mirror assemblies may be provided with a back member which may be black or other desired color.

The mirror back 40 is preferably formed of the same material as the bezel, the mirror back 40 including a centrally disposed support plate portion 54 surrounded by an upstanding flange wall portion 56 integrally joined to the support plate portion by a bight portion 58. The heater 38 is preferably adhered to the adjacent surface of the glass plate 18 through the agency of a non-corrosive pressure sensitive adhesive or film.

In accordance with the present invention, means 60 is provided to display images or information, such as "HEATED" or "OBJECTS IN MIRROR ARE CLOSER THAN THEY APPEAR" or the like on the mirror. As shown in FIGS. 1, 2, 3 and 4, in this embodiment of the invention small holes, such as 62, 64 and 66, are laser cut, etched, sandblasted or otherwise fashioned in the conductive layer on the third surface to depict the image "HEATED", the holes being large enough and numerous enough to display the desired image or other information but not large enough or numerous enough to interfere with coloring or bleaching of the electrochromic material in an aesthetically unpleasing manner. By way of example, the holes, such as 62, 64 and 66, may be approximately 0.010 inches in diameter and be spaced so as to remove approximately 50% of the conductive/reflective layer in the area of the holes, it being understood that the holes may be of any desired configuration.

Figure 4:
FIG. 4 is illustrative of a preferred style of indicia for use in displaying the desired image or information.

As shown FIG. 4, it is preferred that a style of type or other indicia be selected so that after portions of the conductive/reflective layer 20 are removed to create the desired image or information, all of the remaining portions of the conductive/reflective layer 20 on the glass 18 are electrically connected. That is to say, there are no isolated areas or islands of conductive/reflective material defined by the displayed image or information that are not electrically connected to the remaining portions of the conductive/reflective layer. For example, referring to FIG. 4, gaps or openings, such as a, b, c and d, are provided in the display image whereby the electrically conductive/reflective material, such as at e, f, g and h, remaining adjacent the indicia defining the image or information is electrically connected through the gaps or openings a, b, c and d to the remaining portions of the conductive/reflective layer on the glass 18. With such a construction, all of the electrically conductive/reflective material remaining on the glass 18, after the indicia is created, colors or bleaches at substantially the same rate.

It should be noted that when a portion of the conductive/reflective layer 20 is removed, there is a colorization that occurs at the opposite conductive electrode 24 that will not bleach or clear at the same rate as do areas with balanced electrodes. However, if portions of the conductive/reflective layer 20 are removed the residual color resulting from unbalanced electrodes is only slightly visible, and is not aesthetically unpleasing in most instances.

Figure 5:
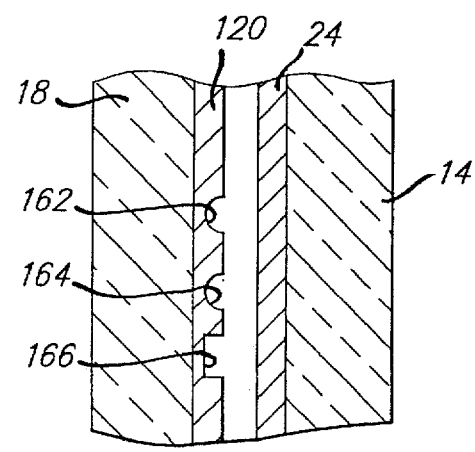
FIG. 5 is a simplified cross sectional view of another embodiment of the invention.

Another embodiment of the invention is illustrated in FIG. 5. In this embodiment of the invention, in order to display the desired information or image, the surface of the conductive layer 120 on the glass 18 is frosted, etched or otherwise fashioned to form valleys, such as 162, 164 and 166, which define the image 60 but which do not extend entirely through the conductive layer 120 so that the valleys do not interfere with the coloring or bleaching of the electrochromic material in an aesthetically unpleasing manner.

Figure 6:
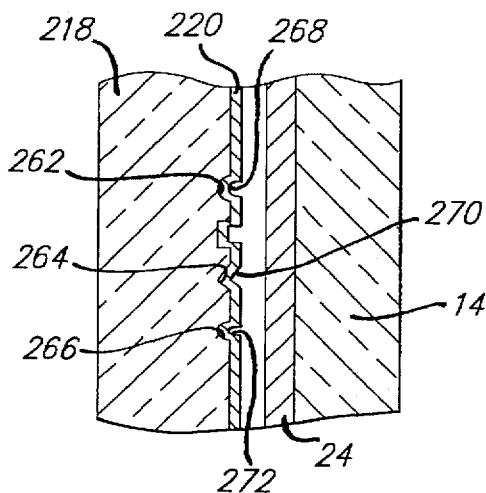
FIG. 6 is a simplified cross sectional view of another embodiment of the invention.

Another embodiment of the invention is illustrated in FIG. 6. In this embodiment of the invention, in order to display the desired image or information, the third surface of the glass 218 is sandblasted, etched or otherwise fashioned, as at 262, 264 and 266 to form the desired image or other indicia after which a conductive/reflective layer 220 is deposited on the third surface of the glass 218. Since the conductive/reflective layer 220 is very thin, the layer 220 conforms to the configuration of the image or other information created on the glass 218, i.e. the valleys 268, 270 and 272 conform to the configuration of the valleys 262, 264, and 266, respectively. Since the valleys in the layer 220 do not create actual openings in the layer 220 even though the valleys conform to the configuration of the indicia created in the glass 218, the valleys do not create interference with the coloring or bleaching of the electrochromic material.

Figure 7:
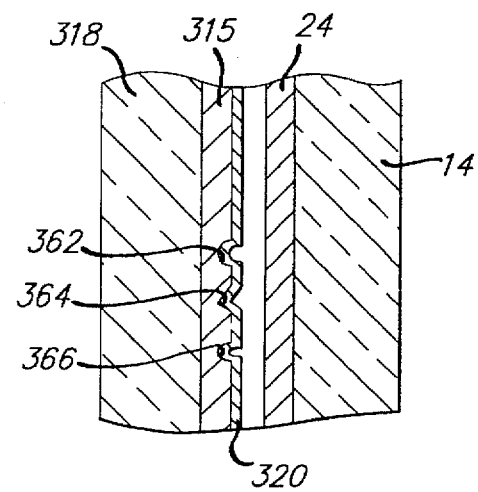
FIG. 7 is a simplified cross sectional view of still another embodiment of the invention.

Another embodiment of the invention is illustrated in FIG. 7. In this embodiment of the invention, in order to display the desired image or information on the mirror, a reflective layer 315 is provided on the third surface of the glass 318, and the layer 315 is laser cut, sandblasted, etched or otherwise fashioned, as at 362, 364 and 366, to create the desired image before the conductive coating, such as 320, is applied to the layer 315 on the glass 318. With such a construction, since there are no openings through the layer 320, the created indicia does not interfere with the coloring or bleaching of the electrochromic material.

While preferred embodiments of the invention have been illustrated and described, it will be understood that various changes and modifications may be made without departing from the spirit of the invention.

What is claimed is:

1. An electro-optically dimming rearview mirror for motor vehicles, said mirror comprising, in combination, front and rear spaced elements, said front element and said rear element defining a chamber therebetween, said front element being transparent, one side of such front element confronting said rear element including transparent electrically conductive means, one side of said rear element confronting said front element including means providing both light reflective and electrically conductive functions, said chamber containing an electro-optic reversibly variable transmittance medium in contact with said transparent electrically conductive means on said front element and said means providing both light reflective and electrically conductive functions on said rear element, said means providing both light reflective and electrically conductive functions on said rear element being effective to reflect light through said medium and through said front element when said light reaches said means providing both light reflective and electrically conductive functions after passing through said medium and through said front element, said mirror including indicia means defined by said means providing both light reflective and electrically conductive functions on the side of said rear element confronting said front element and visible through said medium and through said front element, and means for applying electrical potential to said transparent electrically conductive means and to said means providing both light reflective and electrically conductive functions and thereby to said electro-optic medium to cause variations in the light transmittance of said electro-optic medium.

2. The combination as set forth in claim 1, said means providing both light reflective and electrically conductive functions including a combined conductive/reflective layer on the side of said rear element confronting said front element, portions of said combined conductive/reflective layer defining said indicia means, the remaining portions of said combined conductive/reflective layer being electrically connected together.

3. The combination as set forth in claim 2, said indicia means being partially defined by a plurality of minute spaced openings in said combined conductive/reflective layer, said openings being spaced so as to leave approximately fifty percent of said combined conductive/reflective layer in the area of the openings.

4. The combination as set forth in claim 1, said indicia means being partially defined by said rear element.

5. An electro-optically dimming rearview mirror for motor vehicles, said mirror comprising, in combination, front and rear spaced elements, said front element and said rear element defining a chamber therebetween, said front element being transparent, one side of such front element confronting said rear element including transparent electrically conductive means, one side of said rear element confronting said front element including combined electrically conductive light reflective means, said chamber containing an electro-optic reversibly variable transmittance medium in contact with said transparent electrically conductive means on said front element and said combined electrically conductive light reflective means on said rear element, said combined electrically conductive light reflective means on said rear element being effective to reflect light through said medium and through said front element when said light reaches said combined electrically conductive light reflective means after passing through said medium and through said front element, said mirror including indicia means defined by said combined electrically conductive light reflective means on the side of said rear element confronting said front element and visible through said medium and through said front element, and means for applying electrical potential to said transparent electrically conductive means and said combined electrically conductive light reflective means to cause variations in the light transmittance of said electro-optic medium.

6. The combination as set forth in claim 5, said combined electrically conductive light reflective means including a combined conductive/reflective layer on the side of said rear element confronting said front element, portions of said combined conductive/reflective layer partially defining said indicia means, the remaining portions of said combined conductive/reflective layer being electrically connected together.

7. The combination as set forth in claim 6, said indicia means being partially defined by a plurality of minute spaced openings in said combined conductive/reflective layer, said openings being spaced so as to leave approximately fifty percent of said combined conductive/reflective layer in the area of the openings.

8. The combination as set forth in claim 5, said indicia means being partially defined by said rear element on the side thereof confronting said front element.

* * * * *